United States Patent
Sakai et al.

[11] Patent Number: 5,971,342
[45] Date of Patent: Oct. 26, 1999

[54] BIASING STRUCTURE OF LOCK MECHANISM IN AUTOMOTIVE SEAT SLIDE DEVICE

[75] Inventors: Kiyotaka Sakai, Fukushima; Hidemasa Hirakui, Yokohama; Kiyohiko Kamata, Yokohama; Noboru Takamura, Yokohama; Shinichiro Kita, Yokohama, all of Japan

[73] Assignee: Ohi Seisakusho Co., Ltd., Yokohama, Japan

[21] Appl. No.: 08/933,403

[22] Filed: Sep. 19, 1997

[30] Foreign Application Priority Data

Sep. 25, 1996 [JP] Japan ................................. 8-253233

[51] Int. Cl.⁶ .................................................. F16M 13/00
[52] U.S. Cl. ........................................... 248/430; 248/429
[58] Field of Search ................................... 248/429, 430, 248/419, 424, 420; 267/179

[56] References Cited

U.S. PATENT DOCUMENTS

| | | | |
|---|---|---|---|
| 4,742,983 | 5/1988 | Nihei ........................................ | 248/429 |
| 5,028,028 | 7/1991 | Yamada et al. .......................... | 248/430 |
| 5,167,393 | 12/1992 | Hayakawa et al. ...................... | 248/430 |
| 5,285,993 | 2/1994 | Kamata et al. .......................... | 248/429 |
| 5,727,768 | 3/1998 | Sakamoto ................................ | 248/424 |

FOREIGN PATENT DOCUMENTS

2 188 543  10/1987  United Kingdom .
2 201 451  9/1988  United Kingdom .

*Primary Examiner*—Derek J. Berger
*Assistant Examiner*—Anita King
*Attorney, Agent, or Firm*—Foley & Lardner

[57] ABSTRACT

A biasing structure for biasing a locking pawl-equipped operation rod in a given direction is described. A slit is formed in a rear end of the operation rod. A spring retainer is integrally provided by a bracket through which the operation rod is rotatably connected to a movable rail. The spring retainer includes a rearwardly projected portion whose one surface faces toward a rear end portion of the operation rod and a recess which is formed in a base part of the projected portion and faces toward the rear end portion of the operation rod. A coil spring includes a multi-turned major portion, a front straight portion tangentially extending from a front end of the major portion and a rear straight portion extending radially inward from a rear end of the major portion. Upon assembly of the coil spring, the major portion thereof is disposed on the rear end portion of the operation rod with the front straight portion put in the recess and with the rear straight portion put in the slit while being twisted about its axis against a biasing force produced by the spring. The surface of the rearwardly projected portion is sized and arranged to support the front straight portion of the coil spring when the coil spring is about to be properly assembled.

25 Claims, 11 Drawing Sheets

BIASING STRUCTURE OF LOCK MECHANISM IN AUTOMOTIVE SEAT SLIDE DEVICE

BACKGROUND OF THE INVENTION

1. Field of the Invention

The present invention relates in general to an automotive seat slide device which can slide the seat to a desired fore-and-aft position relative to a vehicle floor, and more particularly to a locking mechanism for the seat slide device so that the seat can be locked at the desired position. More specifically, the present invention is concerned with a biasing structure for biasing a locking pawl operation rod of the lock mechanism in a locking direction.

2 Description of the Prior Art

In order to clarify the task of the present invention, one conventional biasing structure of a lock mechanism in an automotive seat slide device will be described with reference to FIGS. 9 to 14 of the accompanying drawings.

Figure 10:
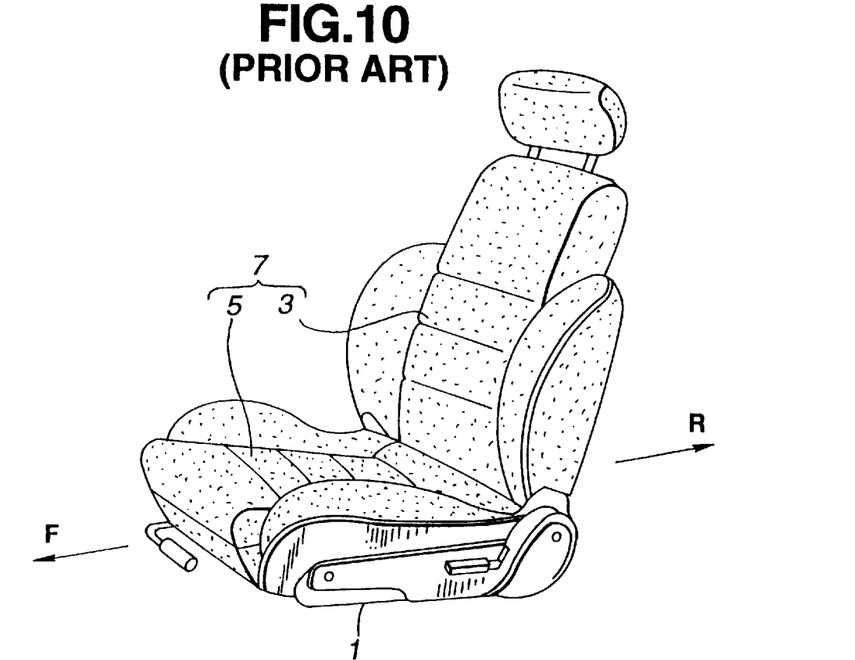
FIG. 10 is a perspective view of an automotive seat to which the slide unit of FIG. 9 is applied.

In FIG. 10, there is shown a seat 7 for a motor vehicle, to which the seat slide device 1 is practically applied. The seat 7 generally comprises a seat cushion 5 and a seatback 3. The seat slide device 1 is arranged below the seat cushion 5 to permit the seat 7 to slide forward "F" and rearward "R" relative to a vehicular floor (not shown).

Figure 9:
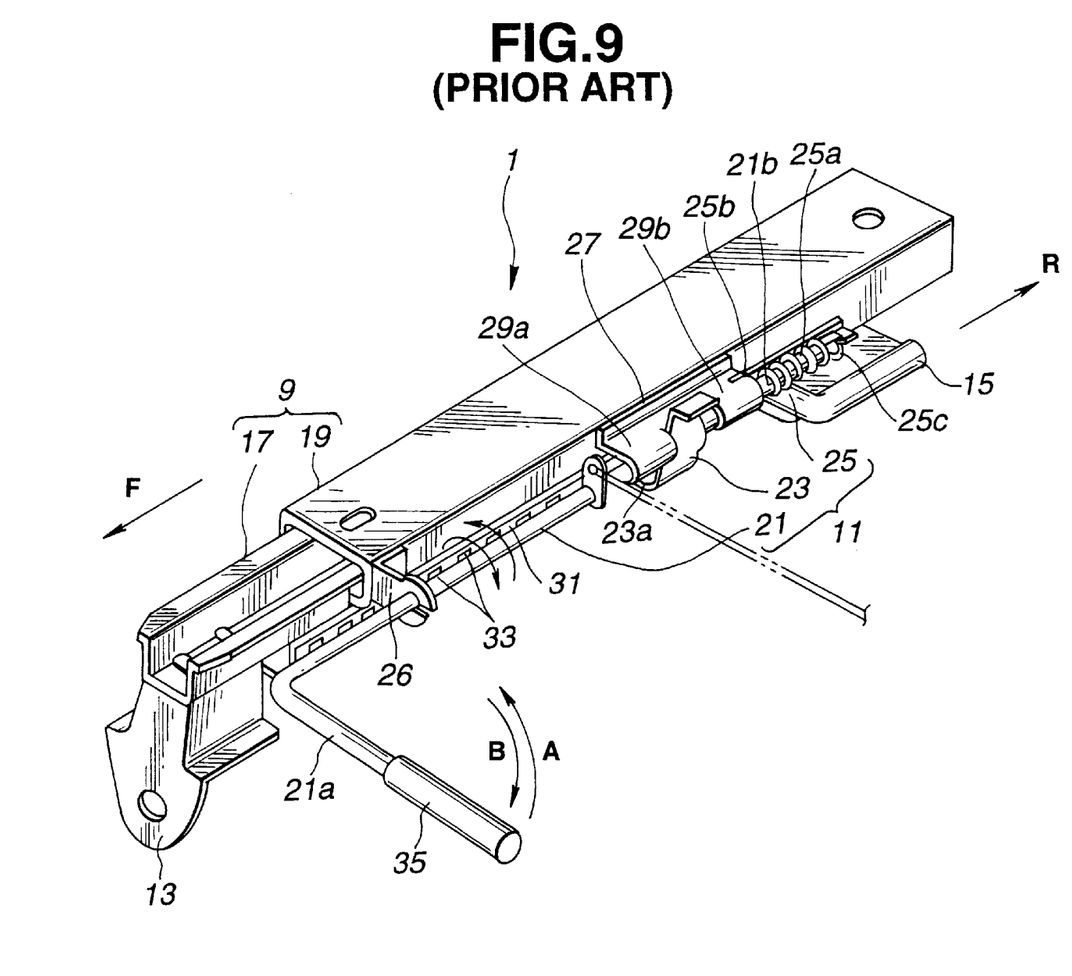
FIG. 9 is a perspective view of a slide unit having a lock mechanism in which a conventional biasing structure is incorporates.

As will be understood from FIG. 9, the seat slide device 1 generally comprises two laterally spaced slide units 9 (only the right side unit is shown) and a lock mechanism 11 incorporated with the right slide unit 9.

As is understood from FIG. 9, each slide unit 9 comprises a lower rail 17 which is secured to a vehicle floor (not shown) through front and rear mounting brackets 13 and 15, and an upper rail 19 which is axially slidably engaged with the lower rail 17. The upper rail 19 has the seat 7 mounted thereon.

The lock mechanism 11 comprises an operation rod 21 which extends along the upper rail 19 and is rotatable about its axis. That is, the operation rod 21 is rotatably held by the upper rail 19 through front and rear brackets 26 and 27. As shown, the rear bracket 27 includes two spaced bearing portions 29a and 29b by which a relatively rear part of the operation rod 21 is rotatably held. Within a space defined between the two bearing portions 29a and 29b, there is arranged a locking pawl 23 that is secured to the operation rod 21 to rotate therewith. A pawl proper of the locking pawl 23 is denoted by numeral 23a in the drawing. The operation rod 21 has a normally bent front part 21a that is equipped with a handle 35.

The lock mechanism 11 further comprises an elongate plate 31 extending along the lower rail 17 and is secured to the same. The elongate plate 31 is formed with a plurality of aligned locking openings 33 with which the locking pawl 23 (more specifically, the pawl proper 23a) is selectively engageable.

A biasing structure is incorporated with the operation rod 21 to bias the same in a direction to achieve the locked engagement of the locking pawl 23 with one of the locking openings 33. The biasing structure employs a biasing spring 25 of coil type, which is disposed about a rear end portion of the operation rod 21. The detail of this conventional biasing structure will be described hereinafter.

When the lock mechanism 11 is in a locked condition as shown in FIG. 9, the locking pawl 23 is kept engaged with one of the locking openings 33 under the force of the biasing spring 25. In this condition, the upper rail 19 (thus, the seat 7 mounted thereon) is locked at a certain fore-and-aft position relative to the lower rail 17 (that is, the vehicle floor).

Thus, when the handle 35 is turned upward in the direction f the arrow "A" in FIG. 9 against the force of the biasing spring 5, the locking pawl 23 is released from the locking opening 33 canceling the locked condition of the lock mechanism 11. Under this released condition, the upper rail 19 is permitted to freely move relative to the lower rail 17.

Figure 11:
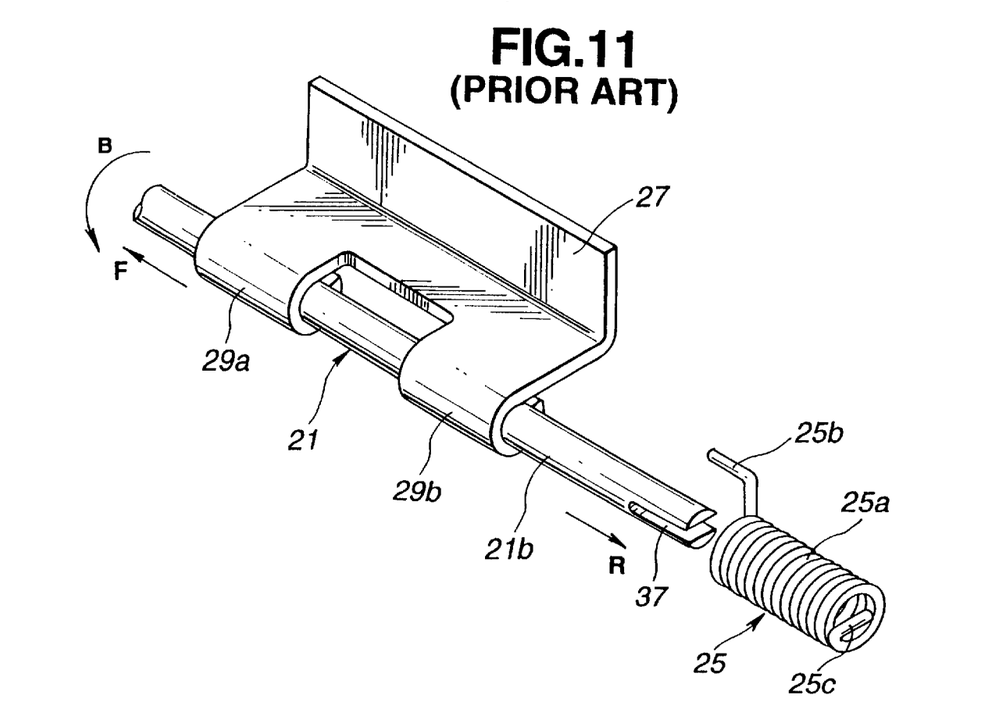
FIG. 11 is a perspective view of the conventional biasing structure.

FIG. 11 is an illustration for explaining the biasing structure of the lock mechanism 11. For clarification of the drawing, the locking pawl 23 secured to the operation rod 21 is not illustrated. As is described hereinabove, the biasing spring 25 is a coil spring disposed about the rear end portion 21b of the operation rod 21 to bias the same in the locking direction, that is, in a direction of the arrow "B" in FIG. 9.

As shown, the biasing spring 25 comprises a multi-turned major portion 25a, a cranked arm portion 25b which projects forward from a front end of the major portion 25a and an inwardly bent portion 25c, which is bent radially inward from a rear end of the major portion 25a. The rear end of the operation rod 21 is formed with an axially extending slit 37.

The biasing spring 25 is properly assembled, when the multi-turned major portion 25a is deeply disposed on the rear end portion 21b of the operation rod 21, the inwardly bent portion 25c is put in the slit 37 and the cranked arm portion 25b is put on an upper surface of the bracket 27, while being twisted by a certain degree against a force produced by the spring 25. When the biasing spring 25 is properly assembled, as described, the operation rod 21 is biased in the direction of a arrow "B", that is, in the direction to achieve the locked engagement between the locking pawl 23 and one of the locking openings 33.

Figure 13A:
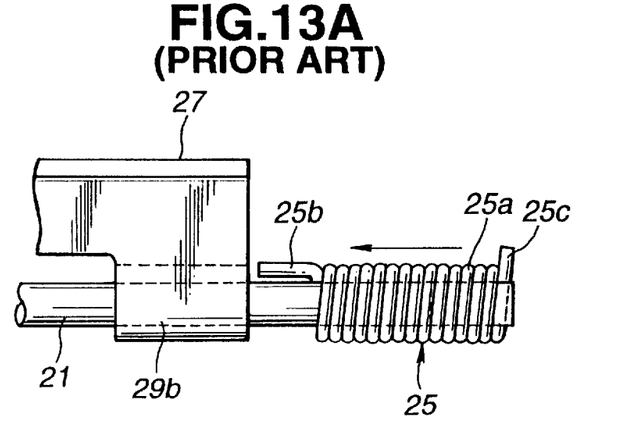
FIGS. 13A, 13B and 13C are plan, side and bottom views, respectively, of the conventional biasing structure in a state wherein the biasing spring assumes a second incompletely assembled condition.
Figure 13B:
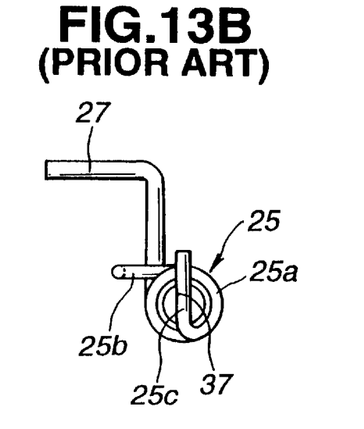
Figure 13C:
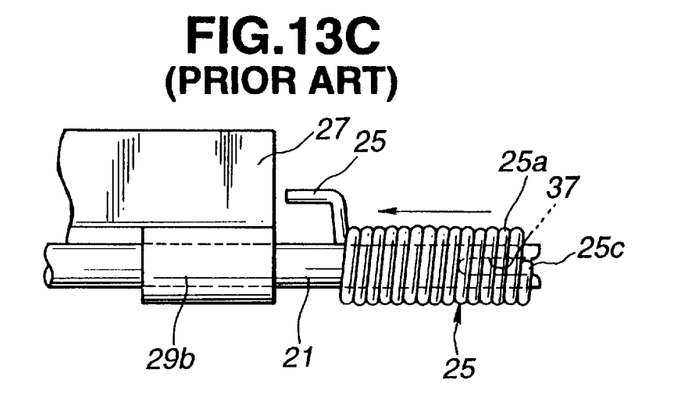
Figure 14A:
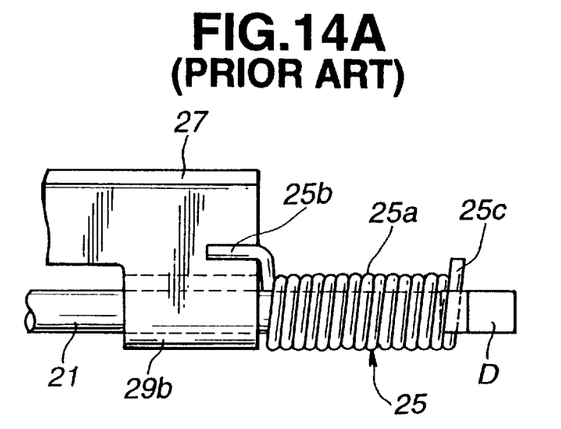
FIGS. 14A, 14B and 14C are plan, side and bottom views, respectively, of the conventional biasing structure in a state wherein the biasing spring assumes a completely assembled condition.

For properly assembling the biasing spring 25, the following assembling steps have been employed, which will be described with reference to FIGS. 12A to FIG. 14C. It is to be noted that FIGS. 12A, 13A and 14A are plan views of the biasing structure of FIG. 11, FIGS. 12B, 13B and 14B are side views of the biasing structure and FIGS. 12C, 13C and 14C are bottom views of the biasing structure.

Figures 12A, 12B:
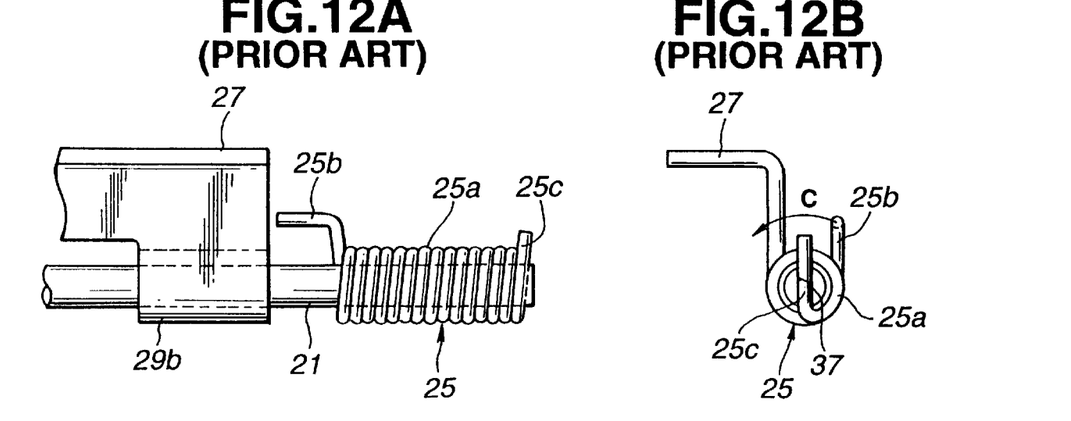
FIGS. 12A, 12B and 12C are plan, side and bottom views, respectively, of the conventional biasing structure in a state wherein the biasing spring assumes a first incompletely assembled condition.
Figure 12C:
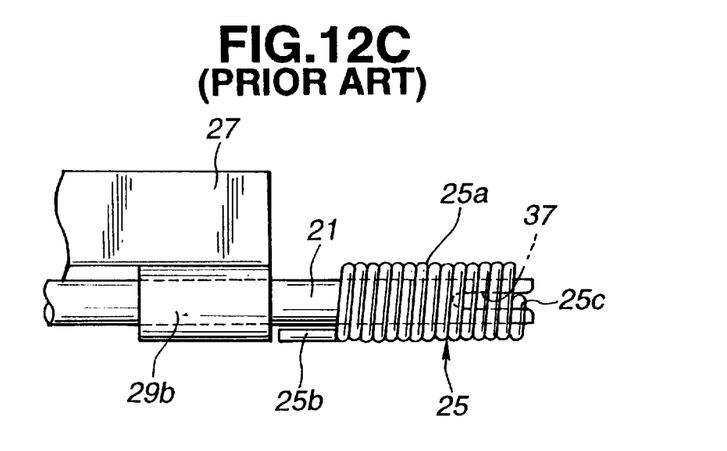

First, as is seen from FIGS. 12A, 12B and 12C, the biasing spring 25 is loosely put on the rear end portion of the operation rod 21 and slightly turned about the same, and then slightly slid toward the bracket 27 to such a position as to establish a shallow engagement of the inwardly bent portion 25c with the slit 37. In this condition, the cranked arm portion 25b is still separated from s the bracket 27, as is seen from FIGS. 12A and 12C. Then, as is seen from FIG. 12B, with the inwardly bent portion 25c kept shallowly engaged with the slit 37, the cranked arm portion 25b is turned or raised in a direction of the arrow "C" against a biasing force produced by the spring 25. Then, as is seen from FIGS. 13A and 13C, with the cranked arm portion 25b kept raised, the biasing spring 25 is slid toward the bracket 27. During this, the inwardly bent portion 25c of the spring 25 slides in the slit 37 keeping the engagement therebetween. When, as is seen from FIGS. 14A, 14B and 14C, the biasing spring 25 is slid to the frontmost position, the cranked arm portion 25b is released to be put on an upper surface of the bracket 27. In this condition, the inwardly bent portion 25c assumes the deepest position in the slit 37.

Figure 14B:
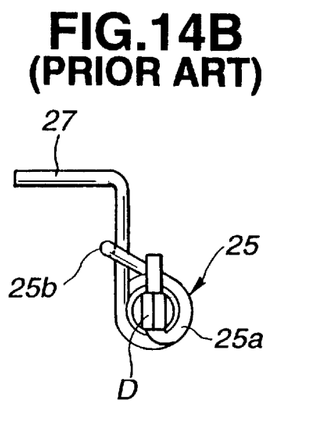
Figure 14C:
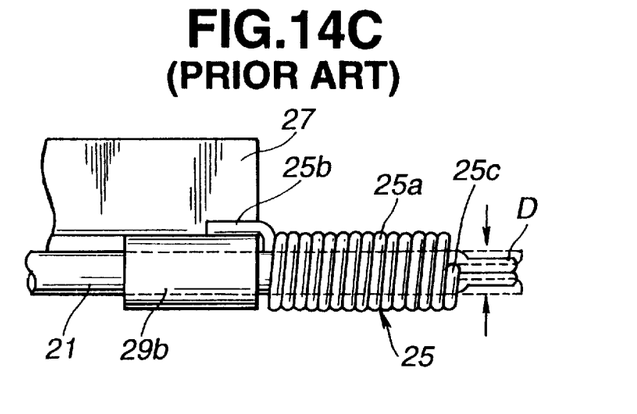

Finally, as is best seen from FIGS. 14B and 14C, the slit-provided rear end of the operation rod 21 is caulked to form a caulked end "D". With this caulked end "D", the inwardly bent portion 25c of the spring 25 is tightly retained in the deepest position of the slit 37, and thus the biasing spring 25 is assuredly retained on the operation rod 21.

However, due to its inherent construction, the above-mentioned biasing structure has the following drawback. That is, in order to retain the biasing spring 25 on the operation rod 21, it is inevitably necessary to caulk the slit-provided rear end of the operation rod 21. As is known, this caulking process is troublesome and thus lowers the assembling efficiency of the biasing structure and thus that of the seat slide device.

SUMMARY OF THE INVENTION

It is therefore an object of the present invention to provide a biasing structure of a lock mechanism in an automotive seat slide device, which can assuredly retain a biasing spring in a proper assembled position without caulking the slit-provided rear end of a control rod.

According to a first aspect of the present invention, there is provided a biasing structure for use in a lock mechanism of an automotive seat slide device having a bracket through which an operation rod is rotatably connected to a movable rail, a locking pawl secured to the operation rod to move therewith and a plurality of locking openings possessed by a fixed rail, the locking pawl being engageable with the locking openings, upon rotation of the operation rod in a given direction, to establish a locked condition of the movable rail relative to the fixed rail. The biasing structure biases the operation rod in the given direction and comprises an axially extending slit formed in a rear end portion of the operation rod; a spring retainer integrally provided by a rear end of the bracket, the spring retainer including a rearwardly projected portion whose one surface faces toward the rear end portion of the operation rod and a recess which is formed in a base part of the projected portion and faces toward the rear end portion of the operation rod; a coil spring including a multi-turned major portion, a front straight portion which tangentially extends from a front end of the major portion and a rear straight portion which extends radially inward from a rear end of the major portion, wherein, upon proper assembly of the coil spring, the major portion thereof is disposed on the rear end portion of the operation rod with the front straight portion put in the recess and with the rear straight portion put in the slit while being twisted about its axis against a biasing force produced by the spring, and wherein the surface of the rearwardly projected portion of the spring retainer is sized and arranged to support the front straight portion of the coil spring when the coil spring is about to be properly assembled.

According to a second aspect of the present invention, there is provided a lock mechanism of an automotive seat slide device having a movable rail movable on a fixed rail. The lock mechanism comprises a bracket secured to the movable rail and having two spaced bearing portions; an operation rod rotatably held by the bearing portions; a locking pawl secured to the operation rod at a position between the spaced bearing portions; an elongate plate secured to the fixed rail, the elongate plate having a plurality of locking openings with which the locking pawl is engageable upon rotation of the operation rod in a given direction; an axially extending slit formed in a rear end portion of the operation rod; a spring retainer integrally provided by a rear end of the bracket, the spring retainer including a rearwardly projected portion whose one surface faces toward the rear end portion of the operation rod and a recess which is formed in a base part of the projected portion and faces toward the rear end portion of the operation rod; a coil spring including a multi-turned major portion, a front straight portion which tangentially extends from a front end of the major portion and a rear straight portion which extends radially inward from a rear end of the major portion, wherein, upon proper assembly of the coil spring, the major portion thereof is disposed on the rear end portion of the operation rod with the front straight portion put in the recess and with the rear straight portion put in the slit while being twisted about its axis against a biasing force produced by the spring, and wherein the surface of the rearwardly projected portion of the spring retainer is sized and arranged to support the front straight portion of the coil spring when the coil spring is about to be properly assembled.

BRIEF DESCRIPTION OF THE DRAWINGS

Other objects and advantages of the present invention will become apparent from the following description when taken in conjunction with the accompanying drawings, in which.

DETAILED DESCRIPTION OF THE EMBODIMENTS

Figure 1:
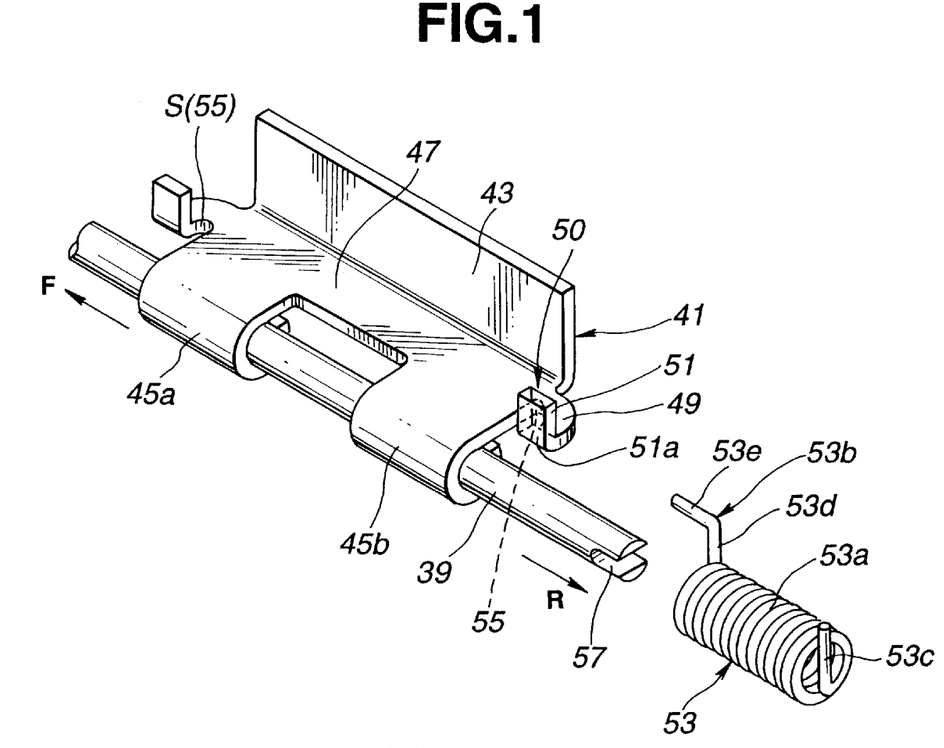
FIG. 1 is a perspective view of a biasing structure of a first embodiment of the present invention, showing a condition wherein a biasing spring is about to be assembled.
Figure 2:
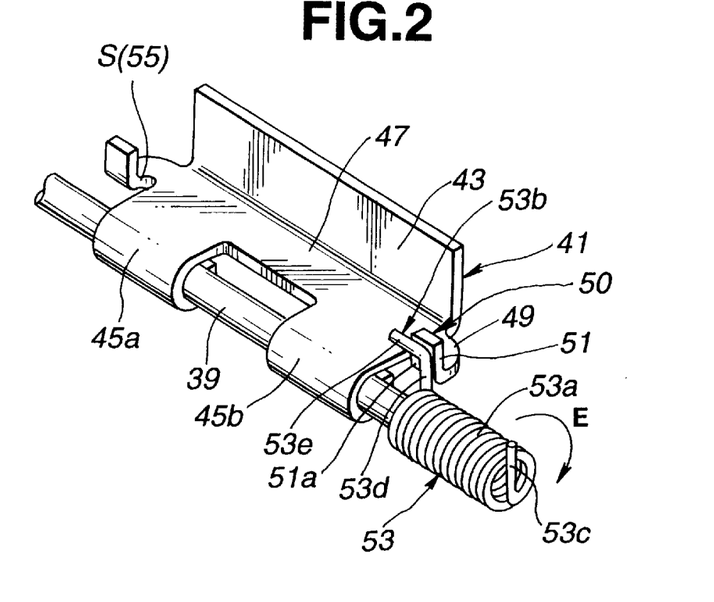
FIG. 2 is a view similar to FIG. 1, but showing a first incompletely assembled condition of the biasing spring.

Referring to FIGS. 1 to 7, particularly FIG. 1, there is shown a biasing structure, which is a first embodiment of the present invention. Like the above-mentioned conventional biasing structure of FIG. 11, the biasing structure of this invention is incorporated with a lock mechanism of a seat slide device, such as the lock mechanism 11 shown in FIG. 9.

In FIG. 1, denoted by references "F" and "R" are forward and rearward directions defined with respect to a seat slide device with which the biasing structure of the invention is incorporated. In the following description, the terms "forward", "rearward", "front", "rear", "inboard", "outboard" and the like are to be understood with respect to the seat slide device.

As is shown in FIG. 1, a bracket 41 includes a vertical wall portion 43, which is secured to a side wall of an upper rail (11, see FIG. 9), a horizontal flat portion 47, which extends inward from a lower end of the vertical wall portion 43, and two spaced curved bearing portions 45a and 45b, which extend outward from the horizontal flat portion 47, for rotatably holding a relatively rear part of an operation rod 39. For clarification, a locking pawl secured to the operation rod 39 at the space between the spaced two bearing portions 45a and 45b illustrated by dotted lines. Locking openings 33, which are formed in a fixed rail and with which the locking pawl is engageable, are also illustrated by dotted lines.

As shown, the horizontal flat portion 47 of the bracket 41 is formed at its rear end with a spring retainer 50. The spring retainer 50 comprises a horizontal part 49 that protrudes rearward from the rear end of the horizontal flat portion 47 and a vertical part 51 that extends upward from an inboard end of the horizontal part 49. Thus, an inside surface 51a of the vertical part 51 faces toward the operation rod 39, as shown.

A front edge of the vertical part 51 is separated from the rear end of the horizontal flat portion 47 due to presence of a recess 55, which is formed in the horizontal part 49. The position and shape of the recess 55 may be well understood when reference is made to a front slit, which is indicated by reference "S" in the drawing. In fact, at a front end of the horizontal flat portion 47, there is also provided a similar spring retainer 50, as shown.

As will become apparent as the description proceeds, the inboard surface 51a of the vertical part 51 serves as a temporarily supporting surface, and the recess 55 of the horizontal part 49 serves to retain a biasing spring 53.

The biasing spring 53 is of a coil type and comprises a multi-turned major portion 53a, a cranked arm portion 53b projecting forward from a front end of the major portion 53a and an inwardly bent portion 53c projecting radially inward from a rear end of the major portion 53a. For the reason which will become apparent as the description proceeds, the length of the inwardly bent portion 53c is somewhat greater than that of the biasing spring 25 of the above-mentioned conventional biasing structure. The cranked arm portion 53b comprises a tangentially extending straight part 53d, which extends tangentially from the front end of the major portion 53a, and an axially extending straight part 53e which extends forward form a leading end of the tangentially extending straight part 53d, as shown.

Figure 4:
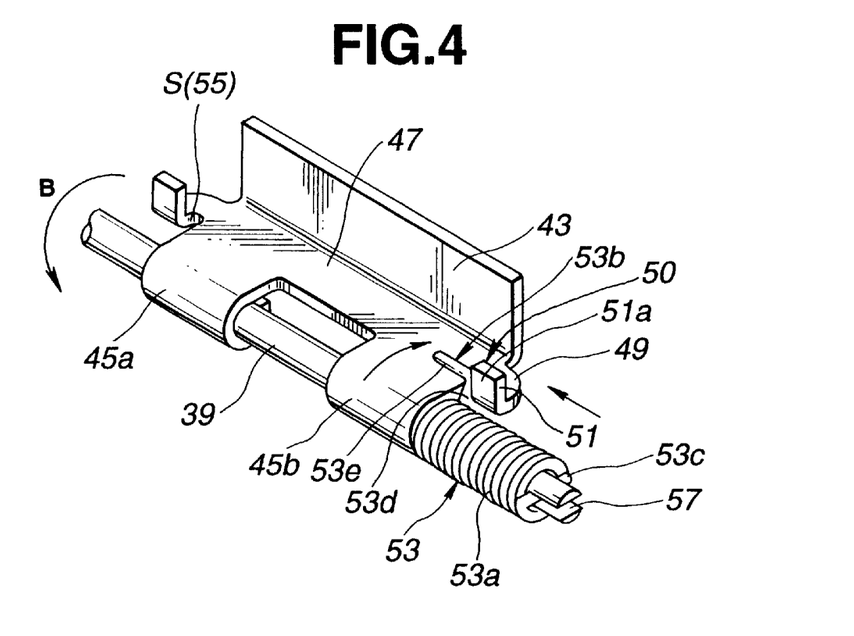
FIG. 4 is a view similar to FIG. 1, but showing a completely assembled condition of the biasing spring.
Figure 5A:
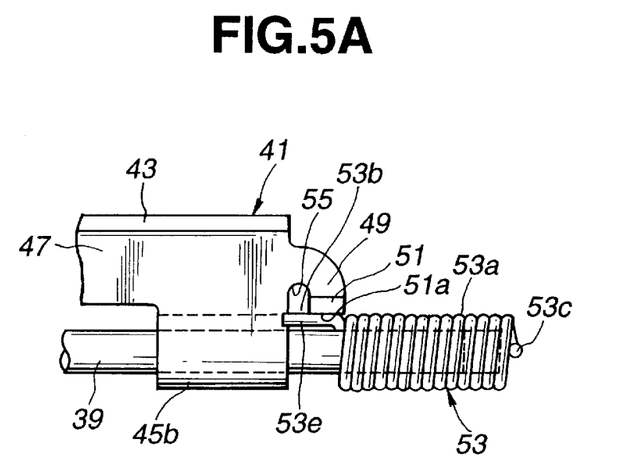
FIGS. 5A, 5B and 5C are plan, side and bottom views, respectively, of the biasing structure of the first embodiment in a state wherein the biasing spring assumes the first incompletely assembled condition of FIG. 2.
Figure 5B:
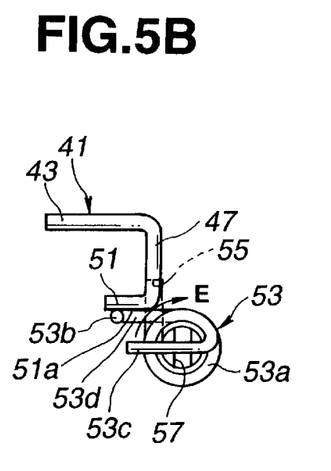
Figure 5C:
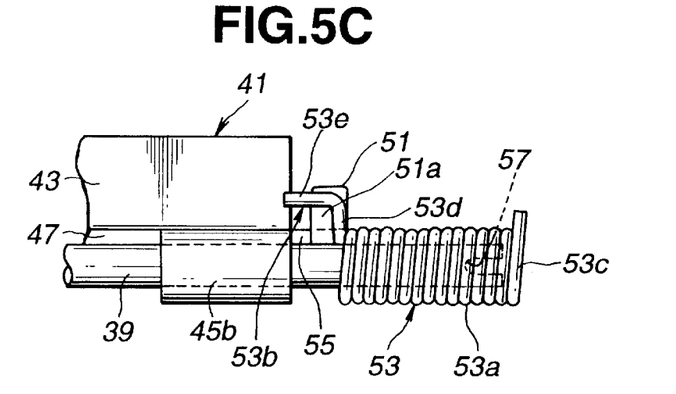

When the biasing spring 53 is properly assembled, the same assumes such a condition as shown in FIG. 4. That is, in this condition, the multi-turned major portion 53a is deeply disposed on the rear end portion of the operation rod 39 having the inwardly bent portion 53c put in the slit 57 and the cranked arm portion 53b put in the slit 57 while being twisted by a certain degree against a force produced by the spring 53. Thus, the operation rod 39 is biased in the direction of the arrow "B", that is, in a direction to achieve a locked engagement between the locking pawl 23 and one of the locking openings 33.

For assembling the biasing spring 53 on the control rod 39, the following assembling steps are employed, which will be described with reference to FIGS. 2 to 4 and 5A to 7C.

First, as is seen from FIGS. 2, 5A, 5B and 5C, the biasing spring 53 is loosely put on the rear end portion of the operation rod 39, and then slid toward the bracket 41 and turned to a position where the axially extending straight part 53e of the cranked arm portion 53b contacts with the inside surface 51a of the vertical part 51 of the spring retainer 50. In this condition, the inwardly bent portion 53c is separated from the slit 57 of the operation rod 39, as will be understood from FIGS. 2, 5B and 5C. Then, with the axially extending straight part 53e of the spring 53 kept in contact with the inside surface 51a of the vertical part 51, the inwardly bent portion 53c is turned in a direction of the arrow "E" by a given angle (for example, 90 degrees in the illustrated embodiment) about the axis of the biasing spring 53 by using pliers or the like tool against a force produced by the spring 53. For facilitating manipulation of the spring 53 by the pliers, the inwardly bent portion 53c is sized somewhat longer than the conventional one, as has been mentioned hereinbefore.

Figure 3:
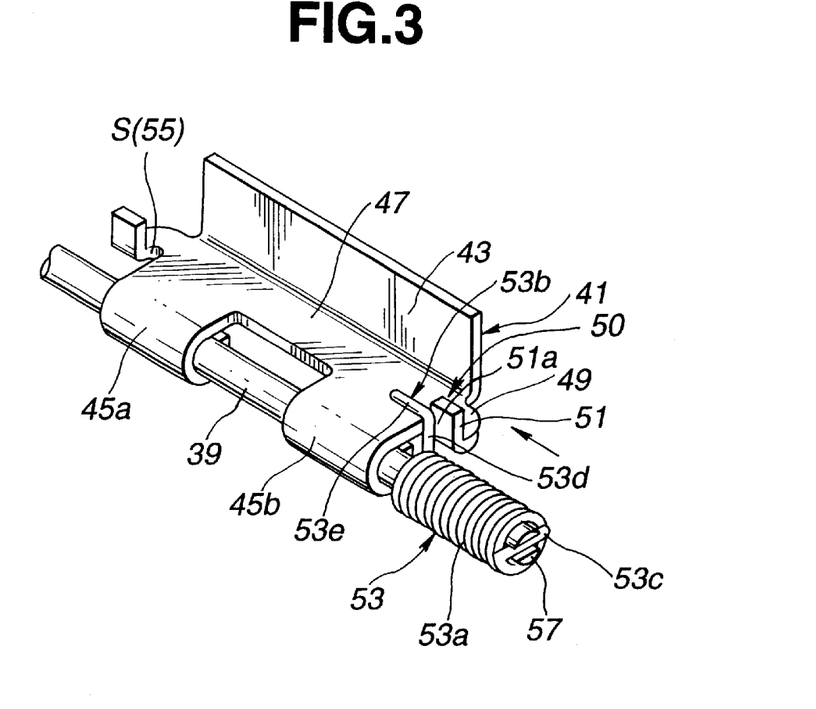
FIG. 3 is a view similar to FIG. 1, but showing a second incompletely assembled condition of the biasing spring.
Figure 6A:
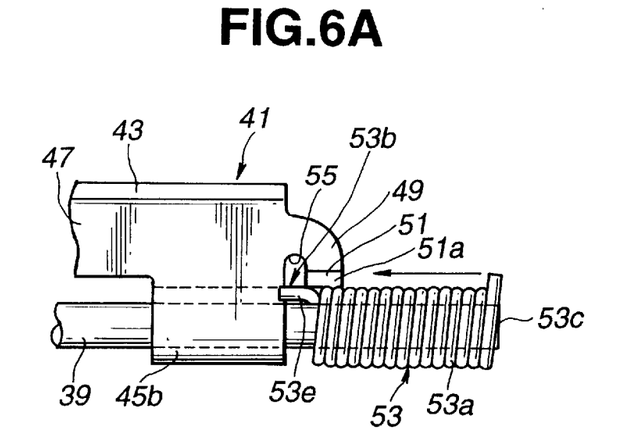
FIGS. 6A, 6B an 6C are plan, side and bottom views, respectively, of the biasing structure of the first embodiment in a state wherein the biasing spring assumes the second incompletely assembled condition of FIG. 3.
Figure 6B:
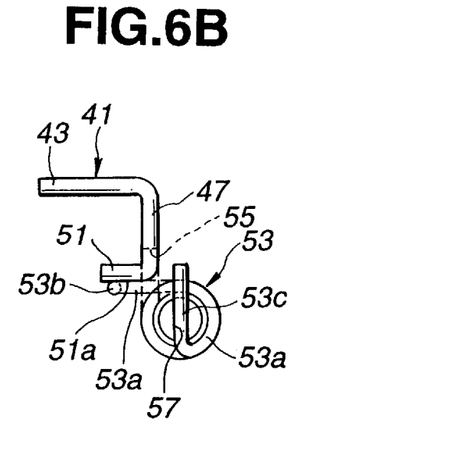
Figure 6C:
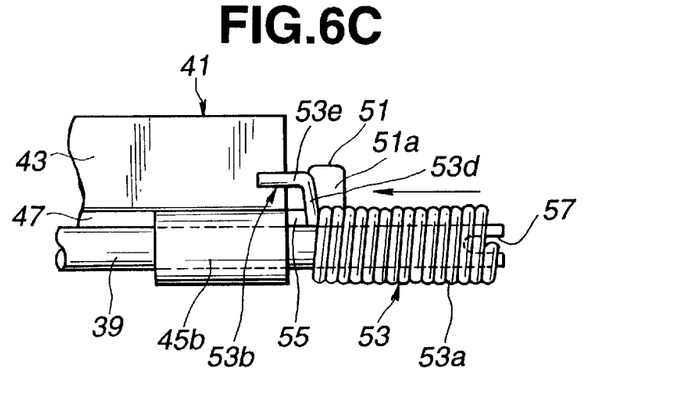
Figures 7A, 7B:
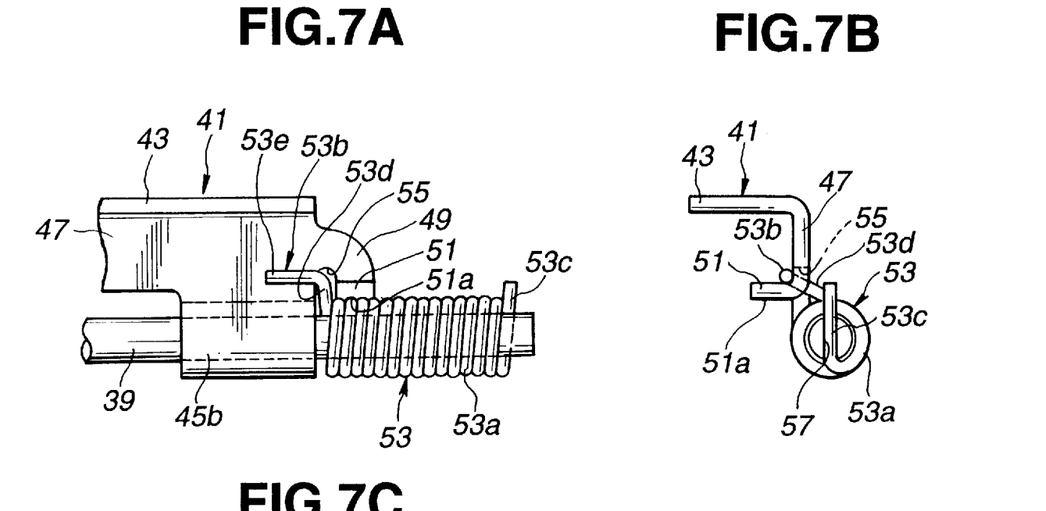
FIGS. 7A, 7B and 7C are plan, side and bottom views, respectively, of the biasing structure of the first embodiment in a state wherein the biasing spring assumes the completely assembled condition of FIG. 4.
Figure 7C:
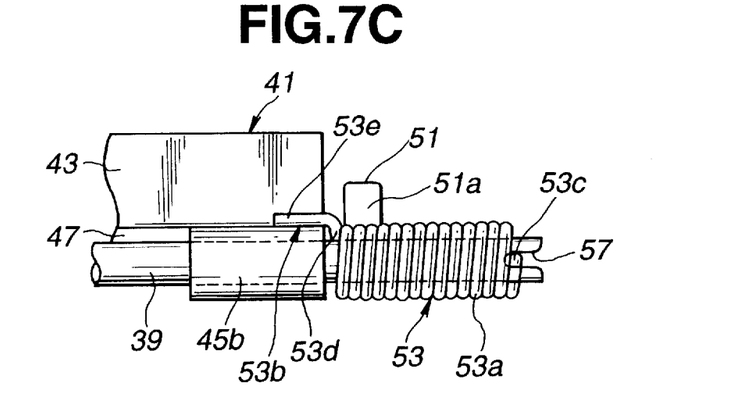

When, due to manipulation by the pliers, the inwardly bent portion 53c of the spring 53 is turned to a position to align with the slit 57 of the operation rod 39, the biasing spring 53 is pushed forward to a position to establish a shallow engagement of the inwardly bent portion 53c with the slit 57. This condition is shown in FIGS. 3 and 6A to 6B.

Then, the biasing spring 53 is further pushed forward. With this, the axially extending straight portion 53e of the spring 53 is slipped beyond the inside surface 51a of the vertical part 51 causing the tangentially extending straight part 53d to slip into the recess 55 defined by the space between front edge of the vertical part 51 and the rear end of the horizontal flat potion 47. This condition is shown in FIGS. 4 and 7A to 7C. That is, in this condition, the cranked arm portion 53b, and thus the spring 53, is assuredly retained by the spring retainer 50. The axially extending straight part 53e of the spring 53 is seated on or retained by the upper surface of the horizontal flat portion 47 of the bracket 43, as is well seen from FIG. 4. Thus, the operation rod 39 is biased in the direction of the arrow "B", that is, in the direction to achieve a locked engagement between the locking pawl (not shown) and one of the locking openings (not shown).

It is to be noted that, due to the above-mentioned retained engagement of the cranked arm portion 53b of the spring 53 with the spring retainer 50, there is no need to caulk the slit-formed rear end of the operation rod 39. That is, in the invention, the troublesome and costly caulking process, which has been employed in the above-mentioned conventional biasing structure, is not necessary for assembling the biasing structure.

Figure 8:
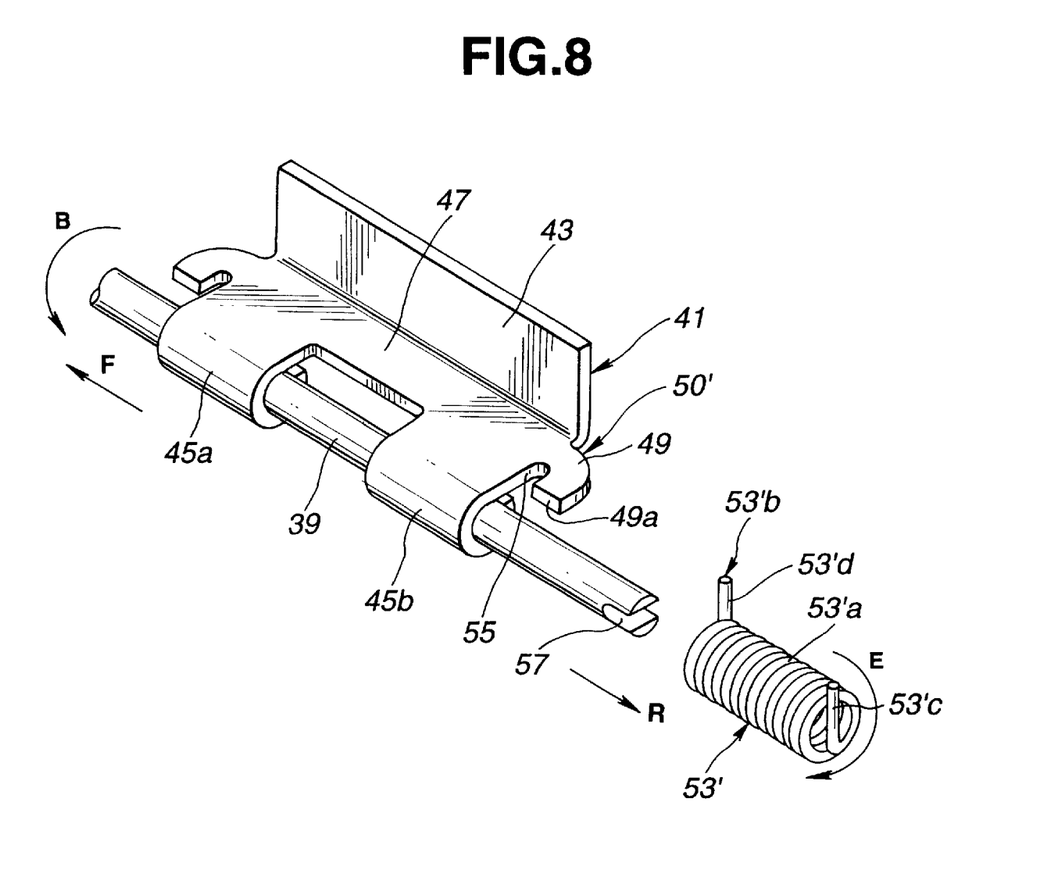
FIG. 8 is a view similar to FIG. 1, but showing a biasing structure of a second embodiment of the present invention.

Referring to FIG. 8, there is shown a biasing structure which is a second embodiment of the present invention.

Since the structure of this second embodiment is similar to that of the above-mentioned first embodiment, only portions which are different from those of the first embodiment will be described in the following.

A spring retainer 50' possessed by the horizontal flat portion 47 of the bracket 41 comprises only a horizontal part 49, which has a recess 55 facing toward the operation rod 39. An inside surface 49a of the horizontal part 49 serves as a temporarily supporting surface, and the recess 55 serves to retain a biasing spring 53'.

The biasing spring 53' is substantially the same as the above-mentioned spring 53 except for the following. That is, the biasing spring 53' used in this second embodiment has no structure corresponding to the axially extending straight part 53e of the first embodiment. As shown, the spring 53' comprises a multi-turned major portion 53'a, a tangentially extending straight part 53'd projecting tangentially from a front end of the major portion 53'a and an inwardly bent portion 53'c projecting radially inward from a rear end of the major portion 53'a.

For assembling the biasing spring 53' on the control rod 39, the following steps are employed.

That is, first, the biasing spring 53' is loosely put on the rear end portion of the operation rod 39, and then slid toward the bracket 41 and turned to a position where the tangentially extending straight part 53'd contacts with the inside surface 49a of the horizontal part 49. Then, with the straight part 53'd kept in contact with the inside surface 49a, the inwardly bent portion 53'c of the spring 53' is turned by the given angle (viz., 90 degrees) by using the pliers or the like. When, due to manipulation by the pliers, the inwardly bent portion 53'c of the spring 53' is turned to a position to align with the slit 57 of the operation rod 39, the biasing spring 53' is pushed forward to a position to establish a shallow engagement of the inwardly bent portion 53'c with the slit 57. Then, the biasing spring 53' is further pushed forward to cause the tangentially extending straight part 53'd to slip into the recess 55 from the inside surface 49a of the horizontal part 49. In this condition, the tangentially extending straight part 53'd, and thus the spring 53', is assuredly retained by the spring retainer 50'. The tangentially extending straight part 53'd is tightly held by the recess 55. Thus, the operation rod 39 is biased in the direction of the arrow "B", that is, in the direction to achieve a locked engagement between the locking pawl (not shown) and one of the locking openings (not shown).

In the above-mentioned second embodiment, due to the same reason as in the first embodiment, there is no need to caulk the slit-formed rear end of the operation rod 39. That is, also in this second embodiment, the troublesome and costly caulking process is not necessary for properly assembling the biasing structure.

What is claimed is:

1. In a lock mechanism of an automotive seat slide device having a bracket through which an operation rod is rotatably connected to a movable rail, a locking pawl secured to said operation rod to move therewith and a plurality of locking openings formed in a fixed rail, said locking pawl being engageable with said locking openings upon rotation of said operation rod in a given direction, to establish a locked condition of said movable rail relative to said fixed rail, a biasing structure for biasing said operation rod in said given direction, comprising:

an axially extending slit formed in a rear end portion of said operation rod;

a spring retainer integrally formed from a rear end of said bracket, said spring retainer including a rearwardly projecting portion having one surface facing toward the rear end portion of said operation rod and a recess formed in a base part of said projecting portion and facing toward the rear end portion of said operation rod;

a coil spring including a multi-turned major portion, a front straight portion tangentially extending from a front end of the major portion and a rear straight portion extending radially inward from a fear end of said major portion, wherein, upon proper assembly of said coil spring, said major portion thereof is disposed on said rear end portion of said operation rod with said front straight portion put in and latchedly engaged with said recess and with said rear straight portion put in said slit while being twisted about its axis against a biasing force produced by the spring, and wherein said surface of said rearwardly projecting portion of said spring retainer is sized and arranged to support said front straight portion of the coil spring when said coil spring is about to be properly assembled.

2. A biasing structure as claimed in claim 1, wherein said spring further retainer further includes a vertically extending part that extends upward from said rearwardly projected portion, said vertically extending part having a surface merged with said surface of said rearwardly projecting portion of said spring retainer, and in which said coil spring further includes an axially extending straight part that extends forward from a leading end of said front straight portion, said axially extending straight part being put on an upper surface of the rear end of said bracket upon assembly of said coil spring.

3. A method for assembling a coil spring to a biasing structure, comprising the steps of:

(a) disposing loosely a coil spring on a rear end portion of an operation rod in such a manner that a front straight portion of the coil spring contacts with a surface of a rearwardly projecting portion of a spring retainer;

(b) turning a rear straight portion by a given angle about an axis of said coil spring keeping said front straight portion in contact with said surface;

(c) sliding said coil spring forward further to establish a shallow engagement of said rear straight portion with a slit at said rear end portion of said operation rod when said rear straight portion is turned to a position to align with said slit; and (d) sliding said coil spring forward to cause said front straight portion to slip into a recess in said spring retainer from said surface to establish a retained engagement of said front straight portion with said recess.

4. A method for assembling a coil spring to a biasing structure as claimed in claim 3, wherein said rear portion is fully engaged with said slit.

5. A method for assembling a coil spring to a biasing structure as claimed in claim 3, wherein said given angle is approximately 90 degrees.

6. A method for assembling a coil spring to a biasing structure comprising the steps of:

(a) disposing loosely a coil spring on a rear end portion of an operation rod in such a manner that a axially extending straight part of the coil spring contacts with a surface of a vertically extending part of the spring retainer;

(b) turning a rear straight portion by a given angle about an axis of said coil spring keeping an axially extending straight part portion in contact with a surface of said spring retainer;

(c) sliding said coil spring forward to establish a shallow engagement of said rear straight portion with a slit at said rear end portion of said operation rod when said rear straight portion is turned to a position to align with said slit; and (d) sliding said coil spring forward to further cause said axially extending straight part to slip out from said surface inducing said front straight portion to fall into a recess in said spring retainer to establish a retained engagement of said front straight portion with said recess.

7. A method for assembling a coil spring to a biasing structure as claimed in claim 6, wherein said axially extending straight part is put on the upper surface of the rear end of said bracket and said rear straight portion is fully engaged with said slit.

8. A lock mechanism of an automotive seat slide device having a movable rail movable on a fixed rail, comprising:
- a bracket secured to said movable rail and having two spaced bearing portions;
- an operation rod rotatably held by said bearing portions;
- a locking pawl secured to said operation rod at a position between said spaced bearing portions;
- a plurality of locking openings possessed by said fixed rail, with which said locking pawl is engageable upon rotation of said operation rod in a given direction;
- an axially extending slit formed in a rear end portion of said operation rod;
- a spring retainer integrally provided by a rear end of said bracket, said spring retainer including a rearwardly projected portion whose one surface faces toward the rear end portion of said operation rod and a recess which is formed in a base part of said projected portion and faces toward the rear end portion of said operation rod;
- a coil spring including a multi-turned major portion, a front straight portion which tangentially extends from a front end of the major portion and a rear straight portion which extends radially inward from a rear end of said major portion,
- wherein, upon assembly of said coil spring, said major portion thereof is disposed on said rear end portion of said operation rod with said front straight portion put in said recess and with said rear straight portion put in said slit while being twisted about its axis against a biasing force produced by the spring, and
- wherein said surface of said rearwardly projected portion of said spring retainer is sized and arranged to support said front straight portion of the coil spring when said coil spring is about to be properly assembled.

9. A bracket for a locking mechanism of a seat slide device, comprising:
- the substantially vertical wall adapted to be secured to a rail of a locking mechanism;
- a horizontal flat portion extending from said vertical wall;
- at least one bearing portion extending from said horizontal flat portion and adapted to rotatably hold an operation rod of the locking mechanism; and
- a spring retainer formed at an end of said horizontal flat portion, wherein the spring retainer includes a horizontal part extending from said horizontal flat portion and a recess formed in said horizontal part.

10. A bracket for a locking mechanism of a seat slide device as claimed in claim 9, wherein said spring retainer further includes a vertical part extending from said horizontal part.

11. A bracket for a locking mechanism of a seat slide device as claimed in claim 10, wherein a front edge of said vertical part is separated from an end of said horizontal flat portion.

12. A bracket for a locking mechanism of a seat slide device as claimed in claim 11, wherein said recess is between said front edge of said vertical part and said end of said horizontal flat portion.

13. A bracket for a locking mechanism of a seat slide device as claimed in claim 10, wherein said spring retainer extends from a front end of said horizontal flat portion.

14. A bracket for a locking mechanism of a seat slide device as claimed in claim 9, wherein an inside surface of said vertical part of said spring retainer faces the operation rod.

15. A bracket for a locking mechanism of a seat slide device as claimed in claim 9, wherein said spring retainer extends from a front end of said horizontal flat portion.

16. A bracket for a locking mechanism of a seat slide device as claimed in claim 9, comprising two bearing portions extending from said horizontal flat portion.

17. A bracket for a locking mechanism of a seat slide device as claimed in claim 9, wherein said at least one bearing portion is curved.

18. A locking mechanism of a seat slide device, comprising:
- a lower rail;
- an upper rail slideably engaged with said lower rail;
- a bracket mounted to said upper rail, having
  - a substantially vertical wall;
  - a horizontal flat portion extending from said vertical wall;
  - at least one bearing portion extending from said horizontal flat portion and rotatably holding an operation rod; and
  - a spring retainer formed at an end of said horizontal flat portion, wherein said spring retainer includes a horizontal part extending from said horizontal flat portion and a recess formed in said horizontal part; and
- a spring disposed on a rear end of said operation rod and adapted to bias said operation rod such that a locking pawl is engageably locked in one of a plurality of locking openings in at least one of said lower rail and upper rail.

19. A locking mechanism of a seat slide device as claimed in claim 18, wherein said plurality of locking openings are in said lower rail.

20. A locking mechanism of a seat slide device as claimed in claim 18, wherein said lower rail is adapted to be mounted to an automobile.

21. A locking mechanism of a seat slide device as claimed in claim 18, wherein said upper rail is adapted to support a seat.

22. A locking mechanism of a seat slide device as claimed in claim 18, wherein said spring is a coil spring.

23. A locking mechanism of a seat slide device as claimed in claim 22, wherein said spring has a cranked arm portion projecting forward from a major portion of said spring.

24. A locking mechanism of a seat slide device as claimed in claim 23, wherein said spring has an inwardly bent portion projecting radially inward from a rear end of said major portion.

25. A locking mechanism of a seat slide device as claimed in claim 18, wherein said spring retainer further includes a vertical part extending from said horizontal part.

* * * * *